United States Patent
Choudhari et al.

(10) Patent No.: US 9,776,835 B2
(45) Date of Patent: Oct. 3, 2017

(54) LIFTING HOOK, SAFETY LATCH OF LIFTING HOOK AND LOCKING AND RELEASING DEVICE OF SAFETY LATCH

(71) Applicant: KONECRANES GLOBAL CORPORATION, Hyvinkää (FI)

(72) Inventors: Amar Choudhari, Pune (IN); Nilesh Dharmadhikari, Pune (IN); Amit Rakshe, Pune (IN); Gaurav Rana, Pune (IN); Olli Kuismanen, Akaa (FI); Jack Hoover, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 0 days.

(21) Appl. No.: 15/124,308

(22) PCT Filed: Mar. 10, 2015

(86) PCT No.: PCT/FI2015/050150
§ 371 (c)(1),
(2) Date: Sep. 7, 2016

(87) PCT Pub. No.: WO2015/136153
PCT Pub. Date: Sep. 17, 2015

(65) Prior Publication Data
US 2017/0073196 A1   Mar. 16, 2017

(30) Foreign Application Priority Data
Mar. 10, 2014   (IN) .............................. 277/KOL/2014

(51) Int. Cl.
*B66C 1/36* (2006.01)
*F16B 45/02* (2006.01)

(52) U.S. Cl.
CPC ................ *B66C 1/36* (2013.01); *F16B 45/02* (2013.01)

(58) Field of Classification Search
CPC ........... B66C 1/36; F16B 45/02; F16B 45/025
(Continued)

(56) References Cited

U.S. PATENT DOCUMENTS

| | | | | |
|---|---|---|---|---|
| 445,663 A | * | 2/1891 | Stiles ....................... | A22B 5/06 |
| | | | | 119/802 |
| 1,457,648 A | * | 6/1923 | Bailey ..................... | E21B 19/04 |
| | | | | 24/599.7 |

(Continued)

FOREIGN PATENT DOCUMENTS

| CN | 2554147 Y | 6/2003 |
|---|---|---|
| JP | 56-33276 U | 4/1981 |

(Continued)

*Primary Examiner* — Dean Kramer
(74) *Attorney, Agent, or Firm* — Birch, Stewart, Kolasch & Birch, LLP (57) ABSTRACT

A lifting hook, its safety latch and a locking and releasing device of the safety latch are disclosed. The lifting hook includes a hook body having a hook stem and tip. The safety latch is pivotably fastened close to the stem so as to move the safety latch between an open position and a closed position, the safety latch being in its open position substantially against the inside of the hook body in a position that leaves a hook jaw free, while in the closed position a latch end extends across the hook jaw to the hook tip, closing the jaw on the inside thereof. The locking and releasing device of the safety latch includes a locking element that engages the inner surface area of the hook jaw at a distance below the fastening end of the safety latch, and a releasing lever that when turned, releases the locking element.

18 Claims, 4 Drawing Sheets

(58) Field of Classification Search
USPC .................. 294/82.19, 82.2, 82.21, 82.22
See application file for complete search history.

(56) References Cited

U.S. PATENT DOCUMENTS

| | | | | |
|---|---|---|---|---|
| 1,711,346 A | * | 4/1929 | Greve | E21B 19/04 24/599.7 |
| 1,794,694 A | * | 3/1931 | Jensen | E21B 19/04 24/599.3 |
| 3,008,210 A | | 11/1961 | Stovern | |
| 4,039,220 A | * | 8/1977 | Stoops | B66C 1/36 24/600.1 |
| 4,195,872 A | | 4/1980 | Skaalen et al. | |
| 4,977,647 A | * | 12/1990 | Casebolt | B66C 1/36 24/599.5 |
| 5,292,165 A | * | 3/1994 | Wiklund | B66C 1/36 294/82.2 |

FOREIGN PATENT DOCUMENTS

| | | |
|---|---|---|
| JP | 64-21186 U | 2/1989 |
| JP | 2003-2574 A | 1/2003 |
| JP | 2005-343572 A | 12/2005 |

* cited by examiner

LIFTING HOOK, SAFETY LATCH OF LIFTING HOOK AND LOCKING AND RELEASING DEVICE OF SAFETY LATCH

BACKGROUND OF THE INVENTION

The invention relates to a lifting hook comprising a hook body with a hook stem and a hook tip; a safety latch with a fastening end and a free latch end, the fastening end of the safety latch being pivotably fastened close to the hook stem so as to move the safety latch between an open position and a closed position, the safety latch being in its open position substantially against the inside of the hook body in a position that leaves a hook jaw free, while in the closed position of the safety latch the latch end extends across the hook jaw to the hook tip and against it, resting against the inside of the hook body and its jaw, closing the jaw; and means for actuating the safety latch, the means comprising a spring arranged between the safety latch and the hook body and forcing the latch end into the closed position, and a locking and releasing device for locking the safety latch into the open position and for releasing the safety latch from the open position. The invention also separately relates to a safety latch to be attached to existing hooks, the safety latch being of the above-described type, and to a locking and releasing device of the lifting hook safety latch that can be mounted on existing safety latches that are also of the above-described type.

The purpose of a safety latch for a lifting hook is to prevent the load of a crane from falling during the use of the crane and to assist a user of the lifting hook of the crane to load and unload the hook safely and efficiently. The loading of the hook naturally refers to fastening a load to the hook and the unloading, correspondingly, to releasing the load from the hook. Safety and efficiency are considerably increased if the user is able to use both hands at the same time for releasing the load.

In known hooks, the safety latch is typically pressed open against a spring force pushing the safety latch closed, and kept in the open position with one hand. This prevents the use of the other hand for releasing the load as the hand must be used for keeping the safety latch open all the time when the load is being released. Moreover, opening the safety latch of large hooks and keeping it open requires a lot of force. Hence the load is very difficult to release and often another person is needed to keep the safety latch open. There is also a risk of hands or fingers getting caught between the safety latch and the hook body. All this may lead to a temptation to skip the use of the safety latch, for example by tying it permanently into the open position against the inside of the hook body with tape. Assigning a second person to assist is not very cost-effective, when the work contribution of the assistant is time-wise short, i.e. keeping the safety latch open does not usually take much time.

However, methods have been developed to keep the safety latch open without the user having to use his/her hands for it. For example, the safety latch may be provided with a kind of operating handle attached pivotably to the safety latch at a distance from its fastening end, the handle extending around the hook body and being lockable behind the hook body into a position keeping the safety latch open. A safety latch of this type is disclosed in U.S. Pat. No. 3,008,210. In this solution, however, the handle has to be separately released after the load has been detached in order to tension the safety latch again to the closed position. This releasing action may require quite a lot of strength, and if the safety latch has a powerful spring, the user may still hurt his/her hands if they for some reason get caught between the operating handle and the hook body or between the latch end of the safety latch and the hook body. Then again, if the safety latch is left or forgotten completely open after a load has been fastened and for the duration of a subsequent lifting, the safety latch is of no use. Inserting a hoist belt with one hand into the hook jaw easily rotates the hook. In many cases, handling a hoist belt with two hands prevents the hook from rotating around its vertical axis during handling.

SUMMARY OF THE INVENTION

Thus, an object of the invention is to improve the lifting hook and its safety latch so as to solve the aforementioned problems. This object is achieved by the solution of the invention that is characterised in that the locking and releasing device of the safety latch comprises a locking element arranged on the back surface of the safety latch, which element in its locking position against the surface of the hook body engages the inner surface area of the hook jaw at a distance below the fastening end of the safety latch, and a releasing lever that extends to the front side of the safety latch and, when turned, releases the locking element and, thus, allows the safety latch to turn into its closed position. Preferred embodiments of the invention are disclosed in the dependent claims.

The invention is, thus, based on a locking element fastened to the back surface of the safety latch, by means of which the safety latch can be kept against the hook body after the hook body has been manually turned into this position.

The locking element may preferably comprise a locking magnet with a locking surface that in its locking position engages the surface of the hook body and locks the safety latch into its open position. In such a case, the releasing lever may be fastened to the locking magnet, whereby when the releasing lever is turned, it also turns the locking magnet and releases it from its locking position and, thus, allows the safety latch to turn to its closed position. In its turned position, the magnet can no longer retain the safety latch which then moves into its closed position that closes the jaw of the lifting hook. However, the locking lever need not necessarily be fastened to the magnet, but may be configured to wrench the magnet off the hook body.

It should also be noted that the locking element need not necessarily be a locking magnet, but it may also be provided by adhesive locking, mechanical locking, such as by a spring catch or some other fastening opened mechanically or electrically from a short distance by means of a releasing lever.

Most preferably, the locking and releasing device of the safety latch is a separate part that is fastened for example by means of strong adhesive, glue or a screw to the back surface of the safety latch. This permits extremely advantageous retrofittings to existing lifting hooks and safety latches. It may also be pre-installed in the lifting hook or safety latch fixedly or preferably at least in part detachably.

So that the same locking and releasing device would fit as many lifting hook profiles as possible, its mounting frame according to an embodiment comprises a base part that is fastened to the back surface of the safety latch, and a height-adjustable fastening may be arranged to the base part for the releasing lever and the locking magnet attached to it.

To prevent damage to the locking and releasing device, it is expedient that the releasing lever forms a closed loop having a back part that extends to the back side of the safety latch, serves as the fastening for the locking magnet and has side branches extending to both sides of the safety latch, and a front part that extends to the front side of the safety latch, comes into contact with the load being lifted and has side branches extending to both sides thereof that connect through springs to the side branches of the back part. A one-sided lever and all other levers that extend to the front side of the safety latch and are capable of the releasing action are naturally also possible, if they can be made sufficiently strong.

An advantage of the lifting hook, safety latch and its locking and releasing device according to the invention is that the safety latch is convenient to use and reliable. Consequently, the safety latch improves safety without invoking in the operating staff any desire to avoid using it or to remove it from the actual lifting apparatus.

The locking and releasing device of the invention is extremely simple, which also makes its manufacturing costs small. The use of the safety latch and its locking and releasing device is also very easy, since their operation is clearly visible from their structure. Even though the locking and releasing lever was damaged, it would in not in any way endanger the safe usage of the lifting hook, because in case of damage, the safety latch preferably always returns to its closed position.

LIST OF FIGURES

The invention will now be described in more detail by means of preferred working examples and with reference to the accompanying drawings, and in all figures, the lifting hook and safety latch operate in the same manner.

DETAILED DESCRIPTION OF THE INVENTION

Figure 1:
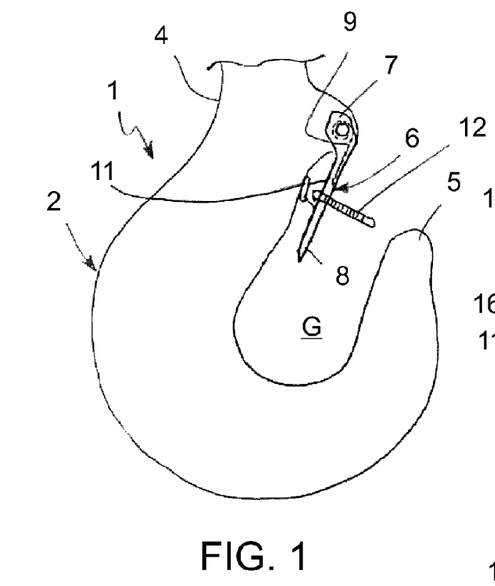
FIG. 1 shows a preferred implementation of a locking and releasing device according to the invention in side view with the safety latch in its open position.
Figure 2:
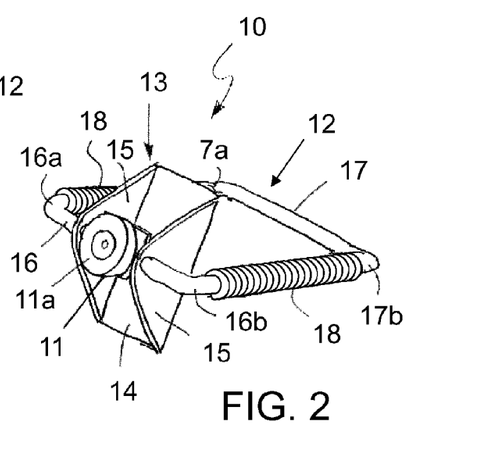
FIG. 2 shows the locking and releasing device of FIG. 1 as a separate perspective view.

Referring first to FIGS. 1 and 2, a lifting hook 1 according to the invention comprises a hook body 2 provided with a hook stem 4 and a hook tip 5; a safety latch 6 with a fastening end 7 and a free latch end 8, the fastening end 7 thereof being pivotably fastened close to the hook stem 4 so as to move the safety latch between an open position and a closed position, the safety latch 6 being in its open position substantially against the inside of the hook body 2 in a position that leaves a hook jaw G free, while in the closed position of the safety latch 6 the latch end 8 extends across the hook jaw G to the hook tip 5, resting substantially against it on the inside of the hook body 2 and its hook jaw G and closing the jaw G; and actuating means of the safety latch which comprise a spring 9 arranged between the safety latch 6 and the hook body 2 and forcing the latch end 8 into the closed position, and a locking and releasing device 10 for locking the safety latch 6 into the open position and releasing it from the open position.

As already mentioned above, the locking element need not necessarily be a locking magnet, but could also be provided by adhesive locking, mechanical locking, such as by a spring catch or some other fastening opened mechanically or electrically from a short distance by means of a releasing lever.

The locking and releasing device 10 shown in more detail in FIG. 2 comprises a locking magnet 11 that is arranged on the back surface of the safety latch 6 and has a locking surface 11a that in its locking position against the surface of the hook body 2 engages the surface of the hook body 2 and locks the safety latch 6 to its open position, and a releasing lever 12 fastened to the locking magnet 11 and extending to the front side of the safety latch 6, which when being turned turns the locking magnet 11 and releases it from its locking position and, thus, allows the turning of the safety latch 6 to its closed position.

The releasing lever 12 is pivotably arranged to a mounting frame 13 that is fastened to the back surface of the safety latch 6. The mounting frame 13 comprises a base part 14 that is fastened to the back surface of the safety latch 6 and two flanges 15 rising from the sides of the base part 14, to which the releasing lever 12 is mounted in such a manner that the locking magnet 11 is between the flanges.

The locking magnet 11 with its locking surfaces 11a can preferably be round, as described herein, in which case, after being installed fixedly and irrotationally to the releasing lever 12, it detaches easily from the surface of the hook body 2 when the releasing lever 12 is turned, but remains well attached to the hook body 2 in its locking position, when the locking surface 11a conforms as well as possible with the mating surface of the hook body 2. The locking surface 11a can also be curved or have some other shape depending on the mating surface on the hook body 2.

In the locked position of the locking magnet 11, the releasing lever 12 should preferably extend sufficiently far toward the hook tip 5 so that the load, when being attached to the lifting hook 1 or detached from the lifting hook 1, moves the safety latch 6 to its closed position.

In the locking and releasing device 100 of the safety latch shown in FIGS. 3 to 8, the mounting frame also comprises a base part 140 fastened to the back surface of the safety latch 6, but here the base part 140 has a height-adjustable fastening 150 arranged thereto for the release lever 12 and the locking magnet 11a fastened to it. This way, the same locking and releasing device 100 fits as many lifting hook profiles as possible.

Figure 3:
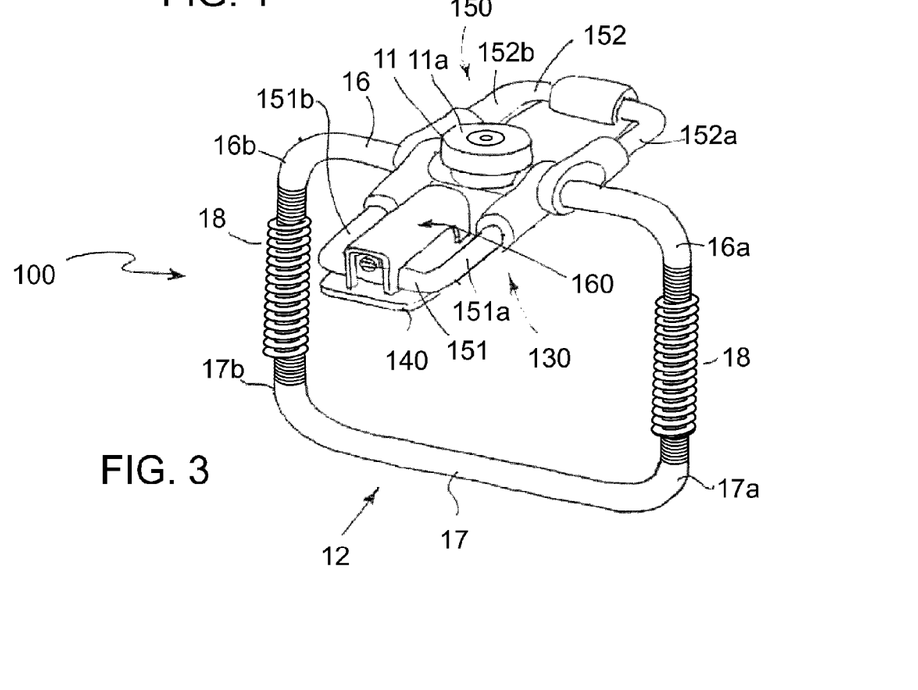
FIG. 3 shows another locking and releasing device according to the invention as a separate perspective view.
Figure 4:
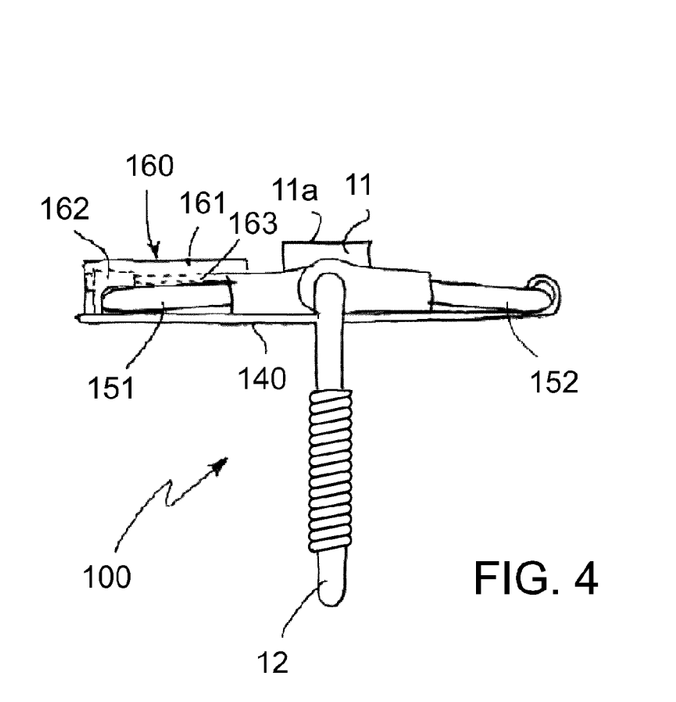
FIG. 4 shows the locking and releasing device of FIG. 3 as seen from the side and in its lowest position.
Figure 5:
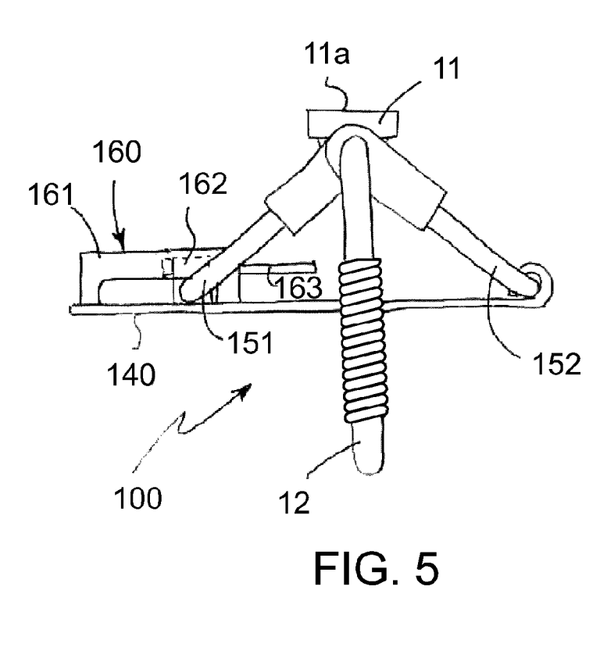
FIG. 5 shows the locking and releasing device of FIG. 3 as seen from the side and in its highest position.

The height-adjustable fastening 150 comprises a first U-shaped loop 151 that is pivotably mounted from its middle part to one end of the base part 140 and a second U-shaped loop 152 that is pivotably mounted from its middle part to the other end of the base part 140. At the ends of branches 151a, 151b and 152a, 152b of the U loops 151 and 152 lead-through openings are formed, through which the releasing lever 12 is guided in such a manner that the U loops 151 and 152 and the releasing lever 12 together form a working entity. The locking magnet 11 is between the ends of these U branches 151a, 151b and 152a, 152b, and the fastening of one U loop 151 to the base part 140 is arranged to be adjustable in distance relative to the corresponding fastening of the second U loop 152.

The adjustable fastening of the U loop 151 comprises an adjustment carriage structure 160 that is fastened to the base part 140 and comprises an adjustment carriage frame 161, an adjustment carriage 162 mounted slidably on the adjustment carriage frame 161, and an adjustment screw 163 arranged to the adjustment carriage 162 and adjustment carriage frame 161 for adjusting the position of the adjustment carriage 162 and, thus, for adjusting the elevation of the releasing lever 12 and the locking magnet 11 fastened to it in relation to the base part 140.

In both implementations of the locking and releasing device 10 and 100 of the safety latch described above, the releasing lever 12 forms a closed loop having a back part 16 that extends to the back side of the safety latch 6, serves as the fastening of the locking magnet 11 and has side branches 16a and 16b extending to both sides of the safety latch, and a front part 17 that extends to the front side of the safety latch 6, comes into contact with the load being lifted and has side branches 17a and 17b that extend to both sides thereof and connect to the side branches 16a and 16b of the back part. The side branches 17a, 17b and 16a, 16b of the front part 17 and back part 16 of the releasing lever 12 are then connected to each other by springs 18 fastened to them. For this, the opposite branches 16a, 17a and 16b and 17b have opposing threads, to which the springs 18 are fastened at each time. This flexible structure prevents damage to the locking and releasing device 10, 100 and its releasing lever 12, even though it was hit by the loads being handled. The structure based on springs 18 provides the advantages that it is flexible in relation to impacts and the releasing lever 12 is adjustable in relation to the front part 17. As already noted above, a one-sided lever and all other levers that extend to the front side of the safety latch and are capable of the releasing action are naturally also possible, if they can be made sufficiently strong.

The operation of both of the locking and releasing devices described above is the same, but will now be described in connection with the locking and releasing device 100 with reference to FIGS. 6 to 8.

Figure 8:
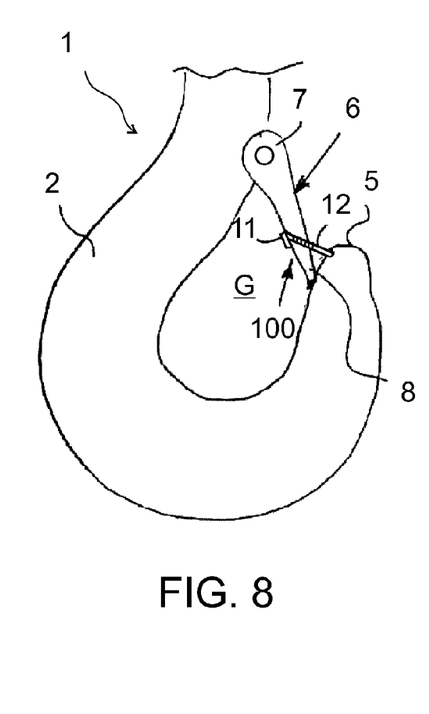

In FIG. 8 the lifting hook 1 and its safety latch 6 are in a normal closed position, which means that the latch end 8 of the safety latch 6 extends across the hook jaw G to the hook tip 5 and against it, resting on the inside of the hook body 2 and its jaw G and substantially closing the jaw G. If in this position, a load is placed on the lifting hook 1, both the safety latch 6 and the locking and releasing lever 100 sink downward and the safety latch 6 is not locked, but both parts 6 and 100 return to their normal position that keeps the jaw G closed.

Figure 6:
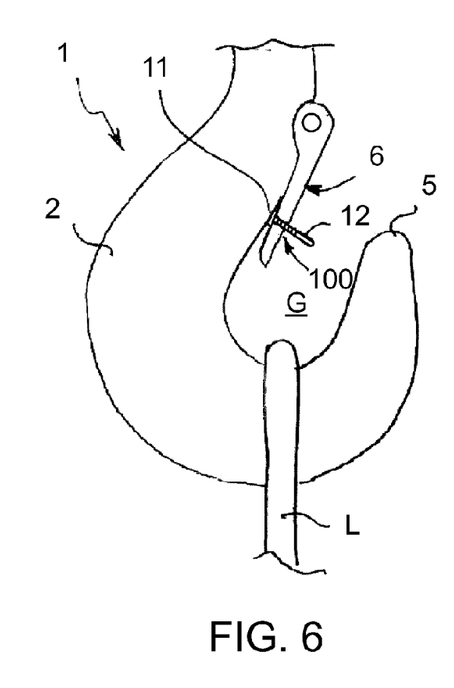
FIGS. 6 to 8 show the operation of the locking and releasing device according to FIGS. 3 to 5 in connection with a lifting hook and safety latch.
Figure 7:
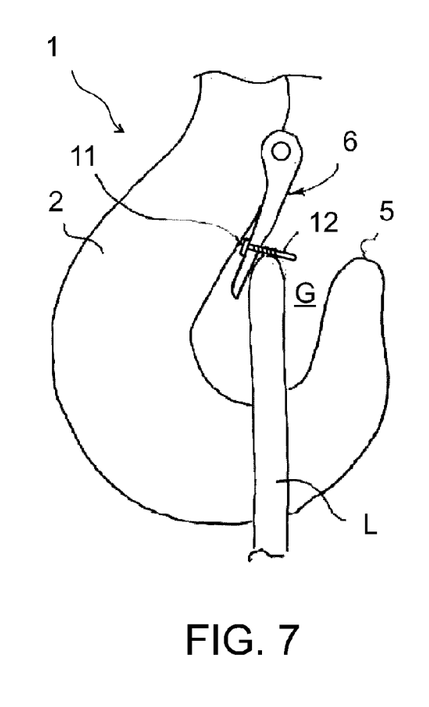

In FIG. 6, the safety latch 6 has been manually turned against the inside of the hook body 2 and the locking magnet 11 of the locking and releasing device 100 has been brought to engagement with the hook body 2, while the safety latch 6 also engages the hook body 2. Now the load L may be removed from the lifting hook 1 with no further need to touch it by hand. When, according to FIG. 7, the load passes the releasing lever 12, the safety latch 6 moves to its closed position according to FIG. 6. In the position of FIG. 6, the placing of the load L in the lifting hook 1 is naturally also possible, in which case the releasing lever 12 also moves the safety latch 6 into its closed position.

Figure 9:
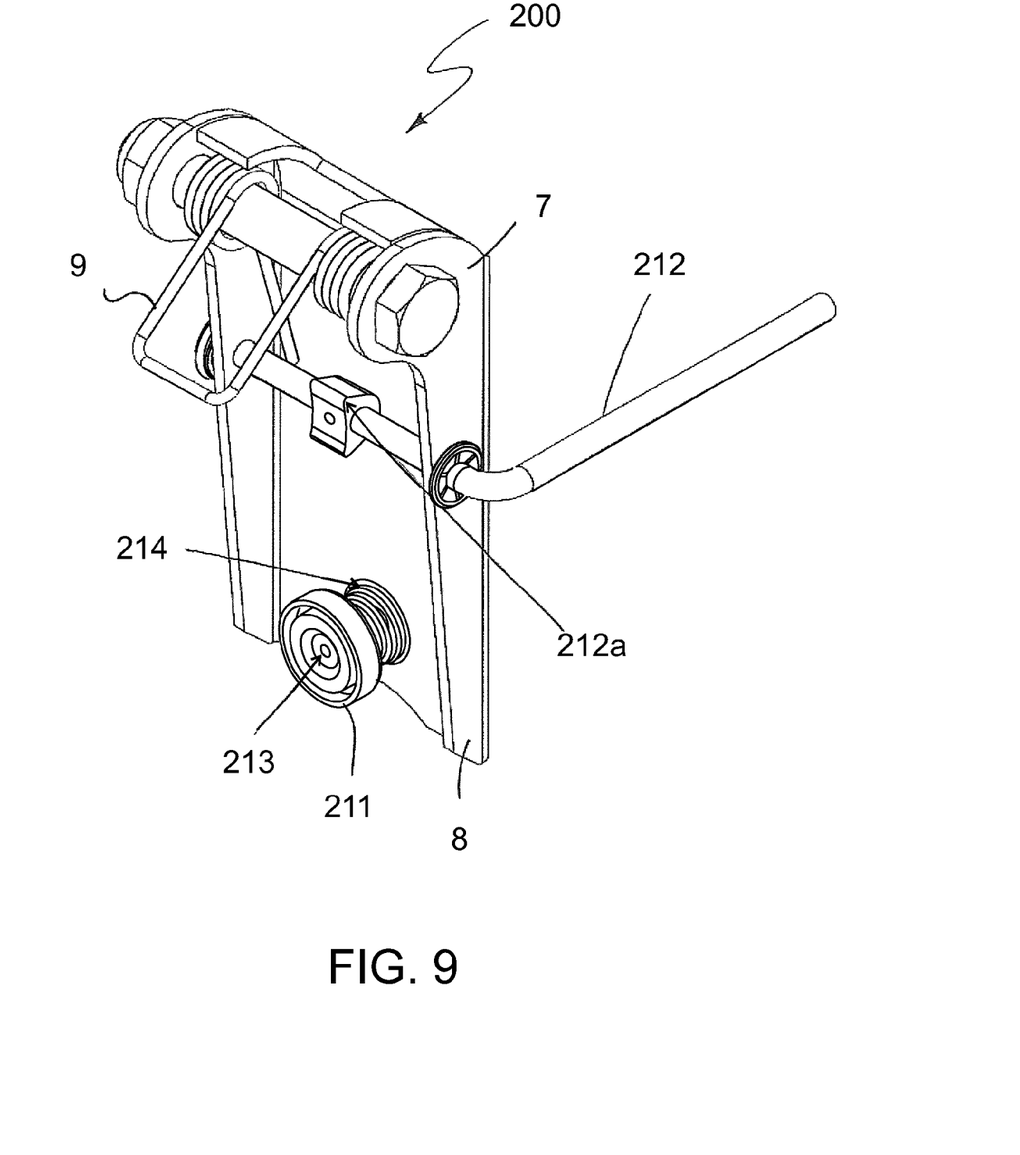
FIG. 9 shows a further locking and releasing device according to the invention as a separate perspective view.

According to FIG. 9, the locking element 211 and the releasing lever 212 can also be mechanically separated from each other. The locking element, e.g. locking magnet 211, is in that case preferably placed close to the latch free end 8, in order to utilize the full moment arm of the safety latch 6, hence decreasing the required locking force from locking element 211.

The locking magnet 211 is preferably attached with an undersized screw 213 to the latch end 8, so that the locking magnet 211 becomes self-aligning, and hence increases the locking force. The locking magnet 211 is preferably fastened to the safety latch 6 with a screw 213 that allows the distance between the locking magnet 211 and the safety latch 6 to be adjusted. Between the locking magnet 211 and safety latch 6 a compression spring 214, most preferably conical spring, can be used to retain the locking magnet 211 at the end of the screw 213. The conical compression spring 214 is space-wise most optimal, as it can be axially compressed more than a cylindrical compression spring and hence gives a greater adjustment range for the locking magnet 211. Compared to a cylindrical compression spring, a conical compression spring also decreases the force required for the locking magnet 211 to align itself to the mating surface of the hook body 2. The locking magnet 211 can also be retained at the end of the screw 213 with a nut or by other means.

As shown in FIG. 9, the releasing lever 212 comprises an eccentric member, e.g. an eccentric wedge 212a to perform the releasing action of the safety latch 6 from open to closed position. As the locking magnet's 211 size is strongly related to the locking force required to keep the latch 6 open against the spring 9, the eccentric wedge 212a can in the radial direction to its tilting axis be significantly smaller, thereby decreasing the effect of the latch locking device on the hook jaw G opening dimension. The eccentric wedge 212a is preferably shaped to such that its radius at its smallest when the releasing lever 212 is in such position that is covers the hook jaw G opening. When the locking magnet 211 is adjusted with the screw 213 to a position such that the eccentric wedge 212a is barely touching the hook body 2 when the latch 6 is in an open position, the rotation of the eccentric wedge 212a will result in the latch free end 8 and hence also the locking magnet 211 moving away from the hook body 2 and thereby releasing the safety latch 6 to the closed position.

The releasing lever 212 is with this setup preferably L-shaped, so that it can be made long enough to cover the hook jaw G opening completely, when the latch 6 is in open position. This increases safety as the operator is less prone to miss the releasing lever 212 when detaching a load from the hook 1. With an L-shaped releasing lever 212, the lever can move past the hook tip 5 in any position, thereby decreasing the risk of it becoming tangling to the hook 1 and thereby being damaged from the impact of a load. The releasing lever 212 is pivoted in the safety latch 6 between the fastening end 7 and the locking magnet 211, preferably closer to the fastening end 7 pivot.

The above description of the invention is only intended to illustrate the basic idea of the invention. A person skilled in the art may thus vary its details within the scope of the accompanying claims without being restricted by the working examples described above.

The invention claimed is:

1. A lifting hook comprising:
a hook body with a hook stem and a hook tip;
a safety latch with a fastening end and a free latch end, the fastening end of the safety latch being pivotably fastened close to the hook stem so as to move the safety latch between an open position and a closed position, the safety latch being in its open position substantially against the inside of the hook body in a position that leaves a hook jaw free, while in the closed position of the safety latch, the latch end extends substantially across the hook jaw to the hook tip and against the hook tip, resting against the inside of the hook body and the hook jaw, closing the hook jaw; and an actuator configured to actuate the safety latch, the actuator comprising:
  a spring arranged between the safety latch and the hook body and forcing the latch end into the closed position; and
  a locking and releasing device for locking the safety latch into the open position and for releasing the safety latch from the open position, wherein the locking and releasing device comprises a locking element arranged on the back surface of the safety latch, and wherein the locking element in a locking position against the surface of the hook body engages the inner surface area of the hook jaw at a distance below the fastening end of the safety latch; and
  a releasing lever that extends to the front side of the safety latch and is fastened to the locking element and to the safety latch and, when turned, releases the locking element and, thus, allows the safety latch to turn into its closed position,
wherein the releasing lever is pivotably arranged to a mounting frame that is fastened to the back surface of the safety latch.

2. The lifting hook as claimed in claim 1, wherein the locking element comprises a locking magnet with a locking surface that in the locking position engages the surface of the hook body and locks the safety latch into the open position.

3. The lifting hook as claimed in claim 2, wherein the releasing lever is fastened to the locking magnet, whereby when the releasing lever is turned, the releasing lever also turns the locking magnet and releases the locking magnet from the locking position and, thus, allows the safety latch to turn to the closed position.

4. The lifting hook as claimed in claim 2, wherein the mounting frame comprises a base part that is fastened to the back surface of the safety latch, and two flanges rising from the sides of the base part, to which the releasing lever is mounted in such a manner that the locking magnet is between the flanges.

5. The lifting hook as claimed in claim 2, wherein the mounting frame comprises a base part that is fastened to the back surface of the safety latch, and that to the base part, a height-adjustable fastening is arranged for the releasing lever and the locking magnet fastened to it.

6. The lifting hook as claimed in claim 5, wherein the height-adjustable fastening comprises:
  a first U-shaped loop that is pivotably mounted from a middle part thereof to one end of the base part; and
  a second U-shaped loop that is pivotably mounted from a middle part thereof to the other end of the base part,
  wherein lead-through openings are formed at the ends of branches of the first and second U-shaped loops, through which the releasing lever is guided in such a manner that the U-shaped loops and the releasing lever form together a working entity,
  wherein the locking magnet is between the ends of the branches, and
  wherein the fastening of the first U-shaped loop to the mounting frame is made adjustable in distance relative to the corresponding fastening of the second U-shaped loop.

7. The lifting hook as claimed in claim 6, wherein the adjustable fastening of the first and second U-shaped loops comprises:
  an adjustment carriage structure that is fastened to the base part and comprises an adjustment carriage frame;
  an adjustment carriage mounted slidably on the adjustment carriage frame, and
  an adjustment screw arranged on the adjustment carriage and adjustment carriage frame for adjusting the position of the adjustment carriage and, thus, for adjusting the elevation of the releasing lever and the locking magnet fastened to releasing lever in relation to the base part.

8. The lifting hook as claimed in claim 1, wherein the releasing lever is in an L-shaped configuration.

9. A lifting hook comprising:
  a hook body with a hook stem and a hook tip;
  a safety latch with a fastening end and a free latch end, the fastening end of the safety latch being pivotably fastened close to the hook stem so as to move the safety latch between an open position and a closed position, the safety latch being in its open position substantially against the inside of the hook body in a position that leaves a hook jaw free, while in the closed position of the safety latch, the latch end extends substantially across the hook jaw to the hook tip and against the hook tip, resting against the inside of the hook body and the hook jaw, closing the hook jaw; and
  an actuator configured to actuate the safety latch, the actuator comprising:
    a spring arranged between the safety latch and the hook body and forcing the latch end into the closed position; and
    a locking and releasing device for locking the safety latch into the open position and for releasing the safety latch from the open position, wherein the locking and releasing device comprises a locking element arranged on the back surface of the safety latch, and wherein the locking element in a locking position against the surface of the hook body engages the inner surface area of the hook jaw at a distance below the fastening end of the safety latch; and
    a releasing lever that extends to the front side of the safety latch and is fastened to the locking element and to the safety latch and, when turned, releases the locking element and, thus, allows the safety latch to turn into its closed position,
  wherein the locking element comprises a locking magnet with a locking surface that in the locking position engages the surface of the hook body and locks the safety latch into the open position, and
  wherein the releasing lever forms a closed loop having a back part that extends to the back side of the safety latch, serves as the fastening for the locking magnet and has side branches extending to both sides of the safety latch, and a front part that extends to the front side of the safety latch, comes into contact with the load being lifted and has side branches extending to both sides thereof and connecting to the side branches of the back part.

10. A safety latch configured to be attached to a lifting hook comprising a hook body with a hook jaw, a hook stem and a hook tip, the safety latch comprising:
  fastening end and a free latch end, the fastening end is configured to be pivotably fastened close to the hook stem so as to move the safety latch between an open position and a closed position, the safety latch configured to be in its open position substantially against the inside of the hook body in a position that leaves the hook jaw free, and while in the closed position of the safety latch, the latch end is configured to extend substantially across the hook jaw to the hook tip and against the hook tip, resting against the inside of the hook body and the hook jaw, closing the hook jaw; and an actuator configured to actuate the safety latch, the actuator comprising:

a spring is configured to be arranged between the safety latch and the hook body and forcing the latch end into the closed position; and a locking and releasing device configured to lock the safety latch into the open position and to release the safety latch from the open position, wherein the locking and releasing device comprises a locking element arranged on the back surface of the safety latch, and wherein the locking element is configured to in a locking position against the surface of the hook body engage the inner surface area of the hook jaw at a distance below the fastening end of the safety latch; and a releasing lever that extends to the front side of the safety latch and is fastened to the locking element and to the safety latch and, when turned, releases the locking element and, thus, allows the safety latch to turn into its closed position, wherein the releasing lever is pivotably arranged to a mounting frame that is fastened on the back surface of the safety latch.

11. The safety latch as claimed in claim 10, wherein the locking element comprises a locking magnet with a locking surface that in the locking position is configured to engage the surface of the hook body and to lock the safety latch into the open position.

12. The safety latch as claimed in claim 11, wherein the releasing lever is fastened to the locking magnet, whereby when the releasing lever is turned, the releasing lever also turns the locking magnet and releases the locking magnet from the locking position and, thus, allows the safety latch to turn to the closed position.

13. The safety latch as claimed in claim 11, wherein the mounting frame comprises a base part that is fastened to the back surface of the safety latch, and two flanges rising from the sides of the base part, to which the releasing lever is mounted in such a manner that the locking magnet is between the flanges.

14. The safety latch as claimed in claim 11, wherein the mounting frame comprises a base part that is fastened to the back surface of the safety latch, and that to the base part, a height-adjustable fastening is arranged for the releasing lever and the locking magnet fastened to the releasing lever.

15. The safety latch as claimed in claim 14, wherein the height-adjustable fastening comprises:

a first U-shaped loop that is pivotably mounted from a middle part thereof to one end of the base part; and a second U-shaped loop that is pivotably mounted from a middle part thereof to the other end of the base part, wherein lead-through openings are formed at the ends of branches of the first and second U-shaped loops, through which the releasing lever is guided in such a manner that the U U-shaped loops and the releasing lever form together a working entity, wherein the locking magnet is between the ends of the branches, and wherein the fastening of one the first U-shaped loop to the mounting frame is made adjustable in distance relative to the corresponding fastening of the second U-shaped loop.

16. The safety latch as claimed in claim 15, wherein the adjustable fastening of the first and second U-shaped loops comprises:

an adjustment carriage structure that is fastened to the base part and comprises an adjustment carriage frame;

an adjustment carriage mounted slidably on the adjustment carriage frame; and an adjustment screw arranged on the adjustment carriage and adjustment carriage frame for adjusting the position of the adjustment carriage and, thus, for adjusting the elevation of the releasing lever and the locking magnet fastened to releasing lever in relation to the base part.

17. The safety latch as claimed in claim 10, wherein the locking and releasing device is designed to be fastened by adhesive, glue or one or more screws on the back surface of the safety latch.

18. A safety latch configured to be attached to a lifting hook comprising a hook body with a hook jaw, a hook stem and a hook tip, the safety latch comprising:

a fastening end and a free latch end, the fastening end is configured to be pivotably fastened close to the hook stem so as to move the safety latch between an open position and a closed position, the safety latch configured to be in its open position substantially against the inside of the hook body in a position that leaves the hook jaw free, and while in the closed position of the safety latch, the latch end is configured to extend substantially across the hook jaw to the hook tip and against the hook tip, resting against the inside of the hook body and the hook jaw, closing the hook jaw; and an actuator configured to actuate the safety latch, the actuator comprising:

a spring is configured to be arranged between the safety latch and the hook body and forcing the latch end into the closed position; and a locking and releasing device configured to lock the safety latch into the open position and to release the safety latch from the open position, wherein the locking and releasing device comprises a locking element arranged on the back surface of the safety latch, and wherein the locking element is configured to in a locking position against the surface of the hook body engage the inner surface area of the hook jaw at a distance below the fastening end of the safety latch; and a releasing lever that extends to the front side of the safety latch and is fastened to the locking element and to the safety latch and, when turned, releases the locking element and, thus, allows the safety latch to turn into its closed position, wherein the locking element comprises a locking magnet with a locking surface that in the locking position is configured to engage the surface of the hook body and to lock the safety latch into the open position, and wherein the releasing lever forms a closed loop having a back part that extends to the back side of the safety latch, serves as the fastening for the locking magnet and has side branches extending to both sides of the safety latch, and a front part that extends to the front side of the safety latch, comes into contact with the load being lifted and has side branches extending to both sides thereof and connecting to the side branches of the back part.

* * * * *